United States Patent [19]

Jelley et al.

[11] Patent Number: 5,368,900

[45] Date of Patent: Nov. 29, 1994

[54] MULTISTEP LASER ABLATION METHOD FOR MAKING OPTICAL WAVEGUIDE REFLECTOR

[75] Inventors: Kevin W. Jelley, La Grange Park; William F. Hoffman, Wheeling; Edward G. Myszka, St. Charles, all of Ill.

[73] Assignee: Motorola, Inc., Schaumburg, Ill.

[21] Appl. No.: 787,446

[22] Filed: Nov. 4, 1991

[51] Int. Cl.⁵ .................. B05D 3/06; B05D 5/06; B23K 26/02

[52] U.S. Cl. .................. 427/555; 427/164; 427/163.2; 156/643; 219/121.69

[58] Field of Search ........... 427/53.1, 163, 164, 427/307, 316, 555; 156/643; 219/121.85, 121.69, 121.71, 121.72

[56] References Cited

U.S. PATENT DOCUMENTS

| 4,169,001 | 9/1979 | Kaiser | 156/89 |
| 4,407,561 | 10/1983 | Wysocki | 427/163 |
| 4,411,678 | 10/1983 | Arai | 427/163 |
| 4,598,039 | 7/1986 | Fischer et al. | 156/643 |
| 4,711,514 | 12/1987 | Tangonan et al. | 427/163 |
| 5,066,357 | 11/1991 | Smyth, Jr. et al. | 219/121.69 |

OTHER PUBLICATIONS

Trewhella, et al., "Total Internal Reflection Mirrors Fabricated in Polymeric Optical Waveguides via Excimer Laser Ablation", SPIE vol. 1377 Excimer Laser Materials Processing and Beam Delivery Systems (1990), pp. 64–72 No Month.

Lalk, et al., "Processing Techniques for Polymer Optical Waveguides", presented at Antech Workshop in 1991 No Month.

Kokubun, et al., "Silicon Optical Printed Circuit Board for Three-Dimensional Integrated Optics", *Electronics Letters*, vol. 21, No. 11 (May 1985).

Primary Examiner—Marianne Padgett
Attorney, Agent, or Firm—Douglas D. Fekete

[57] ABSTRACT

An optical reflector for a polymeric waveguide mounted on a generally planar substrate is formed by a method that includes sequentially irradiating overlapping zones of a polymeric ridge using a series of intermittent laser beam flashes directed normal to the substrate. Each flash is selected to be effective to remove a layer of the ridge to a predetermined depth. Each zone has a linear leading edge and is displaced relative to the leading edge of the immediately preceding zone by a distance corresponding to the predetermined depth. Furthermore, each succeeding zone overlaps the leading edge of the preceding zone. It is surprisingly found that flashes cooperate at the leading edges to form a smooth, oblique surface that, when coated with a reflective metal film, is suited for reflecting a light signal between a path normal to the substrate and a waveguide path parallel to the substrate.

12 Claims, 1 Drawing Sheet

MULTISTEP LASER ABLATION METHOD FOR MAKING OPTICAL WAVEGUIDE REFLECTOR

BACKGROUND OF THE INVENTION

This invention relates to a method for forming a reflector for an optical waveguide of the type mounted onto a generally planar substrate, which reflector redirects a light signal between a first path normal to the substrate and a second path parallel to the substrate. More particular, this invention relates to such method that includes sequentially irradiating a series of overlapping zones of the waveguide with intermittent laser beam flashes directed normal to the substrate that cooperate to form a smooth, angled surface for the reflector.

It has been proposed to produce an optoelectronic package that combines not only components connected by a metal circuit trace for processing electrical signals, but also optical components for processing light signals. The optical components may include devices for emitting light pulses, such as light emitting diodes, or for detecting light pulses, such as PIN detectors. The substrate carries a waveguide for laterally transmitting light signals to or from the component, similar to an electrical circuit trace for conducting electrical signals. The components are mounted onto the substrate overlying the waveguide and emit or receive the light signal along a path normal to the substrate, referred to herein as the normal path, which signals are then transmitted along a path through the waveguide that is parallel to the substrate, referred to herein as the waveguide path. Accordingly, a reflector is situated under the component and includes a mirrored surface at a preferred oblique angle of about 135 degrees relative to the waveguide path, for redirecting the light signal between the component and the waveguide, that is, between the normal path and the waveguide path.

A typical waveguide is formed of a narrow polymeric ridge applied to the substrate, which ridge may be either free standing or subsequently enclosed in a polymeric layer, provided that the adjacent polymer, like the air, has an index of refraction sufficiently distinct from the ridge to cause internal reflection to contain a light signal within the waveguide. Typical methods for forming the reflector generally comprise ablating an oblique surface in the waveguide ridge using a laser beam and thereafter depositing a reflective metallic film. One common method requires tilting the substrate relative to the laser beam. Since, in the production of optoelectronic devices, laser processing is employed to form several features in addition to the reflector surface, it is desired for convenience to ablate the reflector surface in conjunction with other laser forming operations. However, generally, the laser forming operations utilize a beam that is normal to the substrate. Thus, it is necessary to interrupt the laser operations to reorient the substrate in order to ablate the reflector surface. Furthermore, it is necessary to include corrective measures to compensate for the divergence of the beam to obtain an ablated surface at the desired angle. Another method utilizes a beam that is normal to the substrate and ablates the surface by progressively opening or closing a shutter interposed between the laser and the substrate. However, commonly available shutter mechanisms have not been entirely satisfactory to provide uniform, smooth movement needed to progessively ablate the oblique surface. Thus, there is a need for an improved method for forming a reflector surface in a waveguide using a laser directed normal to the substrate, and thus may be carried out in conjunction with other laser operations without reorientation of the substrate, while avoiding the difficulty of incorporating and smoothly operating a complex shutter mechanism within the laser device.

SUMMARY OF THE INVENTION

This invention contemplates a multistep laser ablation method for forming a reflector in an optical waveguide applied to a generally planar substrate to reflect a light signal between a normal path and a waveguide path. The method comprises sequentially irradiating overlapping zones of a waveguide ridge with a series of intermittent laser beam flashes directed normal to the substrate. The intensity and duration of each flash is effective to ablate a layer of the strip having a predetermined depth. Each zone includes a linear leading edge and is located relative to the immediately preceding zone such that the leading edge is displaced from the preceding leading edge by a distance corresponding to the predetermined depth. Furthermore, each zone overlaps the leading edge of the preceding zone. It is found that the overlapping, intermittent flashes cooperate to produce a smooth oblique surface suitable for coating with a reflective metallic film to form the reflector.

Thus, this method forms an ablated surface that is not only orientated appropriately for redirecting light between the normal and waveguide paths, but is also suitably smooth to, after metallization, reflect a coherent signal, as opposed to scattering of the light such as would be produced by an irregular surface. For purposes of comparison, a trailing edge of the zone that is displaced in the same manner described for the leading edges produces a stepped face that includes surfaces normal and parallel to the substrate, but does not include the oblique surface for coherently redirecting a signal. Nevertheless, it is surprisingly found that, at the overlapping leading edges, the several flashes cooperate to produce a sufficiently smooth surface at the desired angle for redirecting the light. The method is carried out conveniently in a series of discrete aim-and-fire steps that do not require progressive changes during laser operation. Furthermore, this invention produces the smooth, oblique surface for the reflector using a laser beam that is normal to the substrate, thereby avoiding the interruption required for reorientation of the substrate and the corrective measures associated with use of an angled beam.

DESCRIPTION OF THE DRAWINGS

This invention will be further illustrated with reference to the figures wherein.

DETAILED DESCRIPTION OF THE INVENTION

Figure 6:
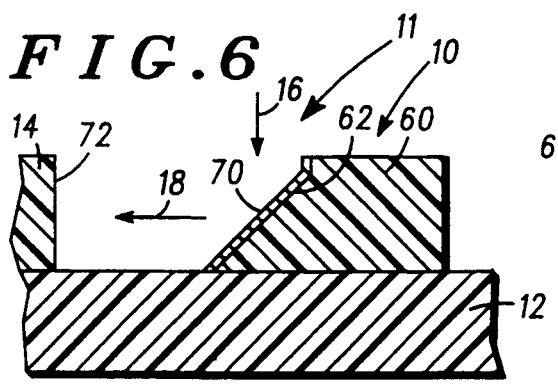
FIG. 6 is a cross-sectional view similar to FIG. 5, but showing a waveguide device including a reflector produced by the method of this invention.

In accordance with a preferred embodiment, the method of this invention is employed to form an optoelectronic device 11 in FIG. 6 that comprises an end reflector 10 for a ridge waveguide 14 carried on a generally planar substrate 12. Substrate 12 is a glass fiber-reinforced epoxy resin board of the type employed for electronic printed circuit boards. It will be appreciated that the FIGS. depict only a region of the device that includes reflector 10 and an adjacent end section of waveguide 14, which region constitutes but a minor portion of the entire device, and further that waveguide 14 extends onto an adjacent region of the device for conveying light signals to or from the regions for processing by components mounted thereon. Reflector 10 is adapted to redirect a light signal between a first path normal to substrate 12 indicated by arrow 16 and a second, waveguide path parallel to substrate 12 in a direction indicated by arrow 18. Alternately, reflector 10 is equally suited for redirecting a light signal emanating from waveguide 14 in a direction opposite arrow 18 to a normal path in a direction opposite arrow 16.

Figure 1A:
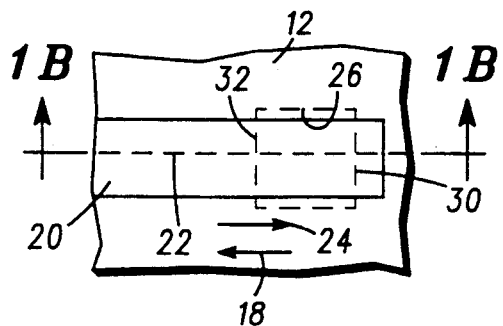
FIG. 1A shows a partial plan view showing a polymeric ridge carried on a substrate in preparation for forming a waveguide reflector by the method of this invention.
Figure 1B:
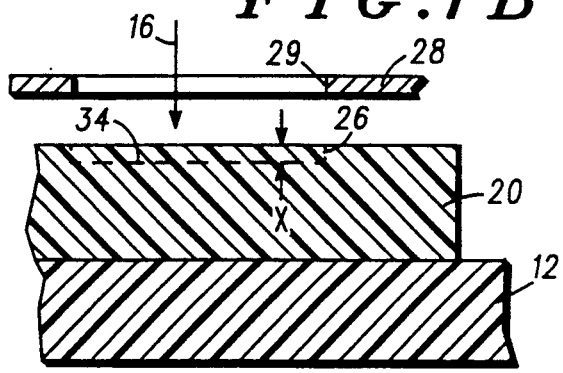
FIG. 1B shows a cross-sectional view of the ridge in FIG. 1A taken along the line 1B–1B in the direction of the arrows.

Referring to FIGS. 1A and 1B, the waveguide and the reflector are formed from a single, continuous polymeric ridge 20 applied to substrate 12. Prior to applying the ridge, substrate 12 may be coated with a polymeric cladding layer (not shown) to provide a suitable distinction in the index of refraction at the interface to enhance internal reflection within the waveguide. Ridge 20 is preferably formed of an epoxy acrylatic resin and applied by spreading a liquid film containing a photoimagable precursor compound onto substrate 12 and selectively irradiating the film using a mask to polymerize the compound to form ridge 20, followed by removal of the undeveloped portion by washing. Ridge 20 preferably has a height of about 50 microns and extends along a center axis 22. For purposes of understanding the laser ablation steps of this invention, reference is made to a direction indicated by arrow 24 parallel to axis 22 away from waveguide 14 and to a direction toward substrate 12 indicated by arrow 16 normal to substrate 12.

In a first step, a first zone 26 of ridge 20 is ablated using a flash from an excimer laser device (not shown) aimed in the direction of arrow 16. Zone 26 includes a leading edge 30 and a trailing edge 32 perpendicular to axis 22. Laser irradiation is limited to zone 26 by a square opening 29 in a shutter 28 interposed between the laser and strip 20. Thus, zone 26 is defined by shutter opening 29. In a preferred embodiment, a conventional laser device is employed that comprises an excimer laser that produces a focused, collimated beam having a fluence of about 175 millijoules per square centimeter at the ridge surface. The laser device includes lens elements (not shown) which may be located between shutter 28 and ridge 20 for focusing the beam onto the targeted zone. The laser produces a series of light pulses, each having a duration on the order of 30 nanoseconds. The duration and intensity of the laser flash is regulated to ablate a layer 34 in FIG. 1B having a depth X, preferably about 2.5 microns. It is pointed out that the substrate surface is selected to have a low ablation rate, particularly relative to the ridge polymer, and thereby minimize removal of material as a result of exposure to the flash in areas about the ridge. As used herein, a laser beam flash refers to a series of laser pulses extending over a fixed period of time, which period is preferably continuous, and cooperating to produce the desired ablation. Although the duration of the flash is dependent upon the ablation properties of the particular polymer selected for strip 20 and the intensity of the laser beam, in general, a flash consisting of between about 100 and 150 pulses is effective for ablation of the desired layer.

Figure 2A:
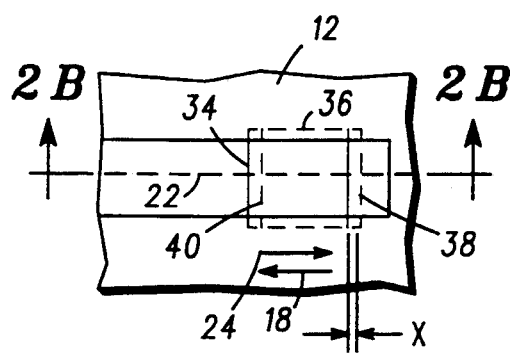
FIG. 2A shows a partial plan view similar to FIG. 1A showing the ridge following a first laser ablation step.
Figure 2B:
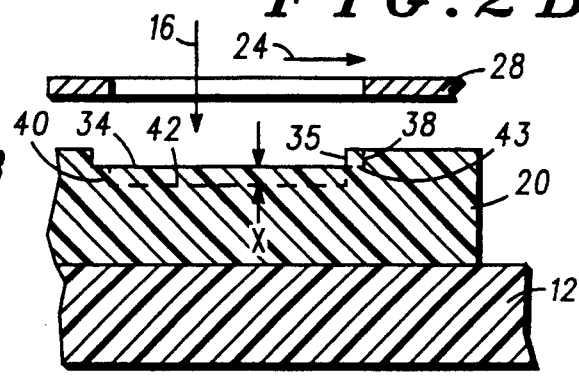
FIG. 2B shows a cross-sectional view showing the ridge in FIG. 2A taken along lines 2B–2B in the direction of the arrows.

FIGS. 2A and 2B show waveguide strip 20 in a condition following laser irradiation of zone 26 in FIGS. 1A and 1B to produce a ablated layer 34. Thereafter, the position of substrate 12 is indexed relative to the laser device including shutter 28. This is suitably accomplished by movement of substrate 12 along axis 22 in the direction of arrow 18 while maintaining the laser device stationary. Alternately, shutter 28 may be moved relative to a stationary laser device and while maintaining substrate 12 stationary. In any event, the position of the substrate relative to the laser beam as defined by shutter 28 is shifted to aim the beam onto a second zone 36 in FIGS. 2A and 2B having a second zone leading edge 38 and a second zone trailing edge 40 perpendicular to center line 22. Second zone leading edge 38 is displaced relative to the leading edge 35 of the first ablated layer 34 by a distance of about X, corresponding to the depth of the first ablated layer 34 and about 2.5 microns in this embodiment. Also, zone 36 overlaps the leading edge 35 of the preceding ablated layer 34. Zone 36 is then irradiated with an intermittent laser beam flash comparable to the flash utilized to ablate layer 34. Referring to FIG. 2B, this second laser flash ablates a layer underlying layer 34 to a depth indicated by line 42. However, in the portion of the strip intermediate edge 35 and edge 38, the flash ablates only to the depth indicated by line 43, similar to the depth of layer 34.

Figure 3:
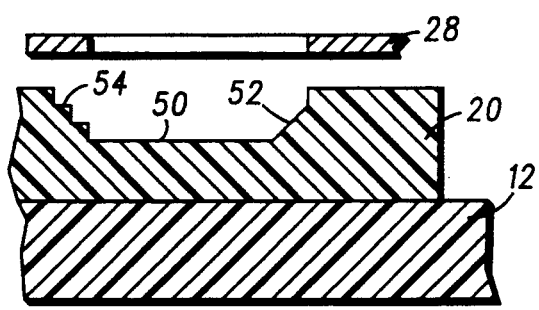
FIG. 3 shows a cross-sectional view of the ridge, similar to FIGS. 1B and 2B, but following still further laser ablation steps.

Following ablation of the second layer corresponding to zone 36, substrate 12 is again shifted along center line 22 in the direction of arrow 24 relative to shutter 28 to aim the beam upon a third zone displaced from the second zone 36 by a distance corresponding to X. FIG. 3 shows a cross-sectional view of the workpiece following ablation of the third zone indicated by 50. As illustrated in FIG. 3, it is a significant feature of this invention that the ablations cooperate to produce a smooth oblique surface 52 at the leading edges, whereas surface 54 formed at the trailing edges consists of distinct ablated steps.

Figure 4:
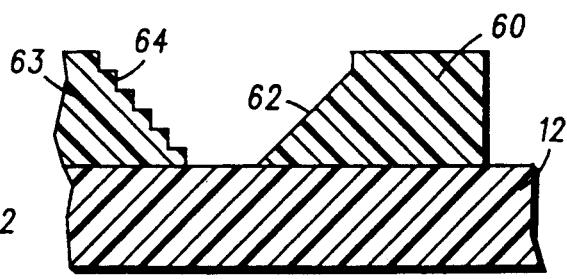
FIG. 4 shows a cross-sectional view of the ridge, similar to FIGS. 1B, 2B and 3, but depicted following completion of a series of laser ablation steps to form a smooth, oblique surface.

In accordance with this method, the steps of targeting the laser beam onto successive zones and exposing each targeted zone to an intermittent laser beam flash are repeated to continue ablating layers of the ridge. Each targeted zone comprises a linear leading edge perpendicular to axis 22 and displaced relative to the leading edge of the immediately preceding zone in direction 24 by a distance X, which is about 2.5 microns in this embodiment. Following each laser ablation step, substrate 12 is indexed relative to the beam to aim the beam as defined by shutter 28 onto a next zone. The steps are repeated until the cumulative depth of the overlapping portion of the several ablated layers severs ridge 20 to the underlying substrate, as seen in FIG. 4. Referring to FIG. 4, following ablation, the ridge comprises a reflector support 60 having a smooth, oblique surface 62 formed by the several ablation steps at the overlapping leading edges and a waveguide portion 63 having a stepped face 64 formed at the nonoverlapping trailing edges. For purposes of illustration, the device is shown as severed after ablation of 6 layers as indicated by the steps of face 64. However, for a ridge having a height of 50 microns as in this embodiment, at least 20 steps, each ablating a layer that is 2.5 microns thick, are employed.

Figure 5:
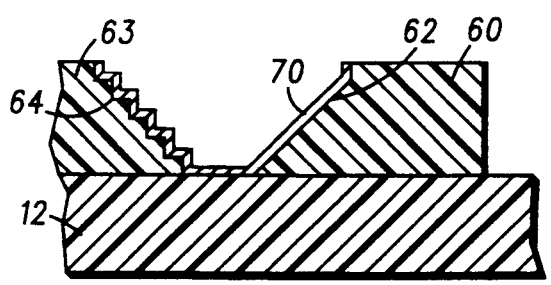
FIG. 5 shows a cross-sectional view of the ridge similar to FIG. 4, but following coating with a reflective metal layer.

Following ablation, a thin metallic film 70 in FIG. 5 is deposited, by sputtering or other suitable process, onto oblique surface 62. Because of the proximity, film 70 tends to also be deposited onto stepped surface 64. Thereafter, a laser beam is directed parallel to arrow 16 to ablate stepped surface 64, while protecting coated surface 62, to form an end face 72 of waveguide 14 as shown in FIG. 6. Face 72 is substantially planar and perpendicular to substrate 12 and also axis 22 so as to face reflector 10 in a suitable orientation for admitting or emitting light signals reflected by reflector 10.

The resulting device 11 shown in FIG. 6 thus features a reflector 10 mounted on a substrate 12 that includes a metal film 70 applied to an oblique surface 62 formed in accordance with the multistep laser ablation method of this invention. The surface is oriented at an angle of about 135 degrees relative to the waveguide 14 for redirecting a light pulse between a normal path 16 and a parallel path 18, in either the direction of the depicted arrows or in an opposite direction. It is a significant advantage of this invention that the oblique surface 62 is formed by ablation using a laser beam directed normal to the substrate, thereby avoiding the complications associated with methods that require the substrate to be tilted relative to the beam, including interruption of laser forming operations for reorientation of the substrate and corrective measures required to compensate for beam divergence. Furthermore, the method of this invention is carried out utilizing discrete steps that permit each zone to be precisely targeted before ablation using a fixed shutter and without necessitating changes to the shutter or the substrate position during laser ablation.

It is a surprising feature of this invention that the several ablation steps cooperate at the overlapping leading edges to produce a smooth, oblique surface suited for specular reflection. This is in marked to the stepped surface formed at the trailing edges that are not overlapped by succeeding ablation steps. While not limited to any particular theory, it is believed that irradiation of the leading edges of preceding zones not only results in further ablation, but also causes heating effective to reflow the polymer into a smooth surface. In the described embodiment, the duration and intensity of each laser flash was adjusted to remove a layer of the polymer waveguide ridge about 2.5 microns deep. The ablation depth is conveniently controlled in a conventional laser device by regulating the number of laser pulses per flash. It is desired to minimize the ablation depth to facilitate reflow into the desired smooth surface. A preferred range for the ablation depth is between 0.1 and 3.0 microns. Furthermore, in the preferred embodiment, each zone was shifted by a distance equal to the depth of the ablated layer. However, the distance between zones may be varied to produce a reflector surface at an optimum oblique angle for reflecting light between the normal and the waveguide paths. As used herein, a distance between successive zones corresponding to the depth of the ablation layer preferably refers to a distance generally within the preferred range of depth of the ablation layer, that is, between about 0.1 and 3.0 microns, and more preferably to a distance approximately equal to the ablation depth.

While this invention has been described in terms of certain embodiments thereof, it is not intended that it be limited to the above description but rather only to the extent set forth in the claims that follow.

The embodiments of this invention in which an exclusive property or privilege is claimed are defined as follows:

1. A multistep laser ablation method for making an optical reflector in a polymeric waveguide ridge applied to a generally planar substrate, said reflector being adapted to reflect a light signal between a first path normal to the substrate and a waveguide path parallel to the substrate, said method comprising sequentially irradiating overlapping zones of said waveguide ridge with a series of intermittent laser beam flashes directed normal to the substrate, each flash having an intensity and a duration effective to ablate a layer of said waveguide ridge having a depth, each said zone having a linear leading edge, each succeeding zone being displaced relative to an immediately preceding zone such that the leading edge of the succeeding zone is displaced from the leading edge of the preceding zone by a distance approximately equal to the depth and further such that the succeeding zone includes the leading edge of the preceding zone, whereby said ablative flashes cooperate to form an oblique surface, and coating the oblique surface with a metallic coating to form the reflector.

2. A multistep laser ablation method for making an optical reflector for a waveguide applied to a generally planar substrate to reflect a light signal between a first path normal to the substrate and a second path parallel to the substrate and extending along said waveguide, said method comprising applying a polymeric ridge to said substrate, said ridge including an elongated section extending along a linear axis, sequentially irradiating a series of overlapping zones of said ridge section with intermittent laser beam flashes, each flash being directed normal to the substrate and having an intensity and a duration effective to ablate a surface layer of said ridge having a depth, each said zone having a linear leading edge perpendicular to the axis, each succeeding zone being displaced relative to an immediately preceding zone such that the leading edge of the succeeding zone is displaced from the leading edge of the preceding zone by a distance approximately equal to the depth and further such that the succeeding zone includes the leading edge of the preceding zone, whereby said flashes cooperate at the leading edges to produce a generally planar oblique surface; and coating the oblique surface with a reflective metallic coating to form the reflector.

3. The method of claim 2 wherein the series includes at least 20 flashes.

4. The method of claim 2 wherein the depth is between about 0.1 and 3.0 microns.

5. A multistep laser ablation method for making a reflector for an optical waveguide applied to a generally planar substrate to reflect a light signal between a first path normal to the substrate and a second path parallel to the substrate extending relative to said reflector in a direction toward said waveguide, said method comprising applying a polymeric ridge to said substrate, said ridge including an elongated section having a linear axis, sequentially irradiating a series of overlapping zones of said ridge section with a series of intermittent laser beam flashes directed normal to the substrate such that each zone is irradiated by a flash having an intensity and a duration effective to ablate a surface layer of said ridge having a depth, each said zone having a linear leading edge perpendicular to the ridge axis, each succeeding zone being displaced relative to an immediately preceding zone such that the leading edge of the succeeding zone is displaced from the leading edge of the preceding zone along said axis by a distance substantially equal to the depth and further such that the succeeding zone includes the leading edge of the preceding zone, whereby said flashes cooperates to produce a generally planar, oblique surface, coating the oblique surface with a reflective metallic coating to form the reflector, and thereafter irradiating a zone of said ridge section that is axially spaced apart from the reflector in the direction of the second path with a laser beam directed normal to the substrate and having a duration and intensity effective to ablate the ridge to form a substantially planar face normal to said substrate and further to said axis, said face facing said reflector for admitting or emitting light signals along the second path to intersect the reflector.

6. The method of claim 5 wherein the series includes at least 20 flashes.

7. The method of claim 5 wherein the depth is between about 0.1 and 3.0 microns.

8. A multistep laser ablation method for making a reflector for an optical waveguide applied to a generally planar substrate to reflect a light signal between a first path normal to the substrate and a second path parallel to the substrate extending relative to said reflector in a direction toward said waveguide, said method comprising the steps of (a) applying a polymeric ridge to said substrate, said ridge including an elongated section having a linear axis, (b) aiming a laser beam normal to the substrate at a first zone of the ridge section having a leading edge perpendicular to the ridge axis, (c) irradiating said first zone with an intermittent laser beam flash to ablate said ridge to form an ablation having a depth and a leading edge corresponding to the zone leading edge, (d) aiming the laser beam at a succeeding zone of said ridge section having a leading edge perpendicular to the axis, said succeeding zone being displaced relative to the ablation such that the leading edge of the succeeding zone is displaced from the leading edge of the ablation along said axis by a distance substantially equal to said depth and further such that the succeeding zone overlaps the ablation edge, (e) irradiating said succeeding zone with an intermittent laser beam flash to further ablate the ridge and thereby form a ablation that has a leading edge corresponding to the leading edge of the succeeding zone, said intermittent laser beam flash having an intensity and a duration effective to ablate a surface layer of said ridge to said depth, (f) repeating steps (d) and (e) to aim and irradiate a series of said zones, whereby said flashes cooperates at the leading edges to produce an oblique surface, and (g) coating the oblique surface with a reflective metallic coating to form the reflector.

9. The method of claim 8 wherein the series includes at least 20 zones.

10. The method of claim 8 wherein the depth is between about 0.1 and 3.0 microns.

11. The method of claim 8 wherein the distance that the leading edge of the succeeding zone is displaced form the leading edge of the ablation is between about 0.1 and 3.0 microns.

12. The method of claim 8 further comprising irradiating a zone of said ridge section axially spaced apart from the reflector in the direction of the second path with a laser beam directed normal to the substrate and having a duration and intensity effective to ablate the ridge to form a substantially planar face normal to said substrate and further to said axis, said face facing said reflector for admitting or emitting light signals along the second path to intersect the reflector.

* * * * *